Patented Feb. 7, 1950

2,496,741

UNITED STATES PATENT OFFICE 2,496,741

2-METHYL-4-KETO-1,3-BENZOTHIOXANE

Howard K. Nason and David T. Mowry, Dayton, Ohio, assignors to Monsanto Chemical Company, St. Louis, Mo., a corporation of Delaware No Drawing. Application June 19, 1946, Serial No. 677,913

5 Claims. (Cl. 260—327)

This invention provides thioxane derivatives having the general formula:

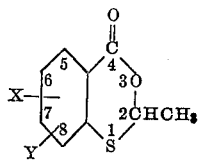

where X is selected from the class consisting of H, Cl, $CH_3$, $NO_2$, $OCH_3$; and Y is selected from the class consisting of H and $CH_3$. A process for producing the above derivatives is also provided herein.

The scheme for numbering substituents is indicated in the above structural formula.

The present products are useful as insecticides or as ingredients of insecticidal products. They may be prepared by reacting in the presence of an acidic catalyst monomeric vinyl acetate with a thiosalicylic acid having the following structure:

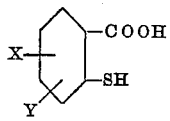

where X and Y are defined above.

It is understood that the substituents X and Y may occupy any position in the aromatic ring not occupied by the hydroxy and carboxy group.

Representative thiosalicylic acids suitable for the present purpose are:

Thiosalicylic acid
Chlorothiosalicylic acid
Bromothiosalicylic acid
Methylthiosalicylic acid
Dimethylthiosalicylic acid
Nitrothiosalicylic acid
Nitro methylthiosalicylic acid
Methoxythiosalicylic acid The process of this invention is preferably carried out by refluxing the thiosalicylic acid with an excess of vinyl acetate in the presence of a material supplying hydrogen ions. Substances supplying hydrogen ions are any acid or acid salt such as $H_2SO_4$, benzene sulfonic acid, HCl, $HNO_3$, $H_3PO_4$, $NaHSO_4$, $CH_3COOH$, $BF_3$ or $ZnCl_2$. It is obvious that other acids will occur to one skilled in the art.

Mercuric acetate may be employed or not as desired.

Temperatures necessary for carrying out the reaction may range from room temperature to the boiling temperature of the reaction mixture at normal atmospheric pressure, although if desired, higher temperatures may be employed by increasing the pressure upon the boiling mixture. In this way, the time of reaction may be considerably shortened.

Since vinyl acetate is a polymerizable ester, it may be desirable to employ an inhibitor of polymerization in the reaction mixture. According to my understanding of the process, the polymerization inhibitor does not affect the course of the reaction. It, however, serves to prevent polymerization of the vinyl acetate from occurring and enables one to recover the unreacted vinyl acetate for use in a subsequent operation.

The invention is illustrated by the following example:

Example

A mixture of 220 g. (1.35 mols) of thiosalicylic acid, 370 g. (4.3 mols) of vinyl acetate, 5.0 g. mercuric acetate, 1.5 cc. sulfuric acid and 1.5 g. hydroquinone were refluxed for 36 hours. The excess vinyl acetate and the acetic acid by-product were distilled rapidly at 200 mm. pressure and the product recovered by distillation through a Vigreux column, taking a fraction boiling at 147° C. (5.0 mm.). The solid product was recrystallized twice from aqueous alcohol to give 161.5 g. (66.5% yield) of 2-methyl-4-keto-1,3-benzothioxane, M. P. 56.5–57.5° C.

Anal. Calcd. for $C_9H_8SO_2$: C, 60.0; H, 4.45; S, 17.75. Found: C, 60.1; H, 4.76; S, 17.90.

In a manner similar to that described above the following substituted thiosalicylic acids are reacted with vinyl acetate:

Chlorothiosalicylic acid
Bromothiosalicylic acid
Methylthiosalicylic acid
Dimethylthiosalicylic acid
Nitrothiosalicylic acid
Nitro methylthiosalicylic acid
Methoxythiosalicylic acid In the above example, an excess of vinyl acetate was employed to serve as a diluent for the reactants. However, any liquid material which is inert under the reaction conditions may be used as a solvent or diluent, or if violent agitation is employed, the reaction may be conducted in the absence of any diluent or solvent.

In a copending application Serial No. 677,911, filed June 19, 1946, one of us has disclosed and claimed a process for reacting various thiosalicylic acids with certain diacetates or chlorideacetates, as well as certain thioxanes not claimed herein.

What we claim is:
1. 2-methyl-4-keto-1,3-benzothioxane.
2. The process which comprises mixing together in the presence of an acidic catalyst, vinyl acetate and a thiosalicylic acid having the following structure:

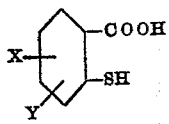

where X is selected from the group consisting of H, Cl, CH$_3$, NO$_2$ and OCH$_3$; and Y is selected from the group consisting of H and CH$_3$.

3. The process which comprises mixing together vinyl acetate and thiosalicylic acid and heating the mixture in the presence of an acidic catalyst.

4. The process which comprises mixing together vinyl acetate and thiosalicylic acid and heating to reflux the mixture in the presence of a catalytic amount of sulfuric acid.

5. The process which comprises mixing and heating together thiosalicylic acid and an excess of vinyl acetate in the presence of an acid catalyst and an inhibitor of vinyl acetate polymerization, and recovering 2-methyl-4-keto-1,3-benzothioxane from the reaction mixture.

HOWARD K. NASON.
DAVID T. MOWRY.

No references cited.